UNITED STATES PATENT OFFICE.

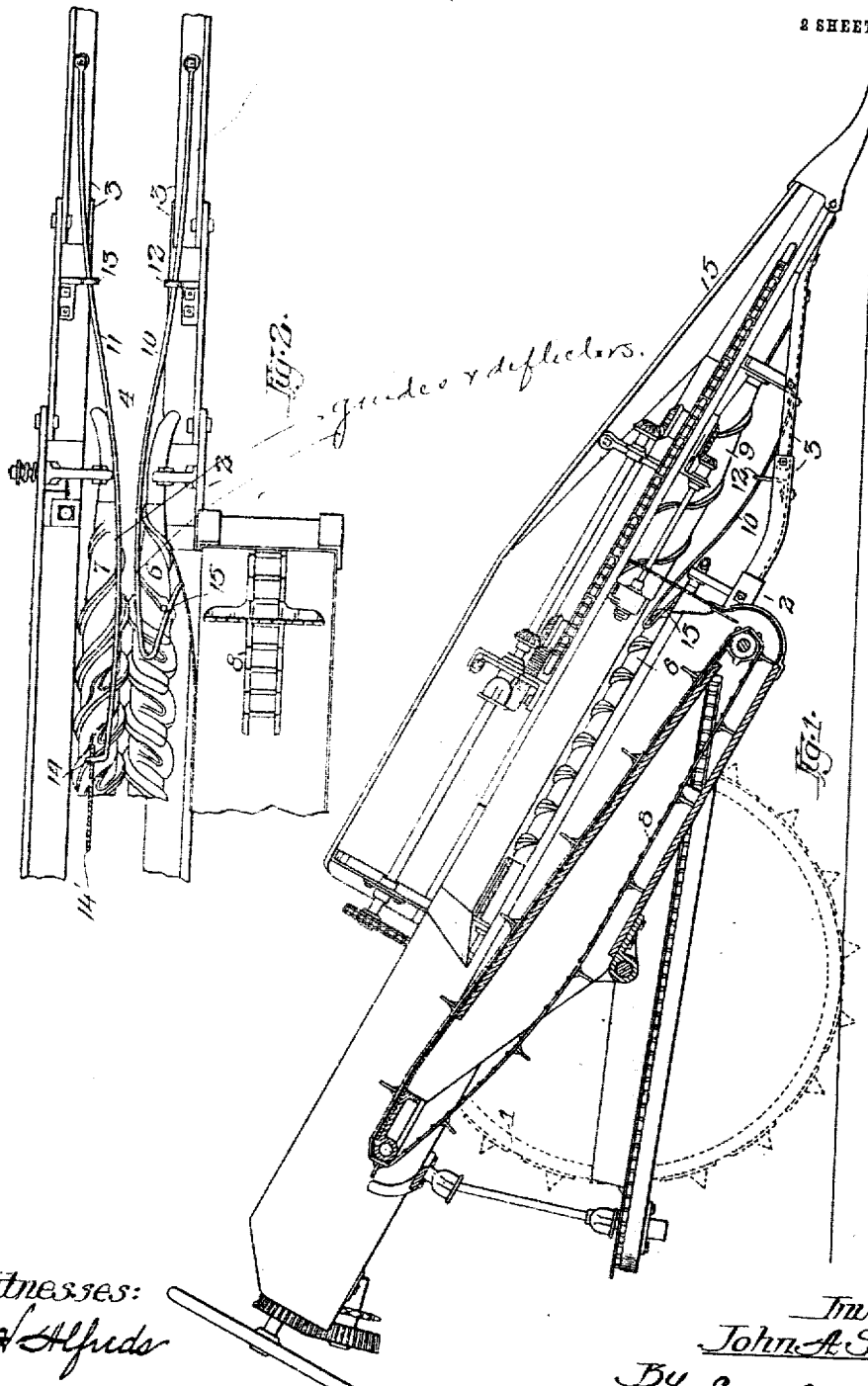

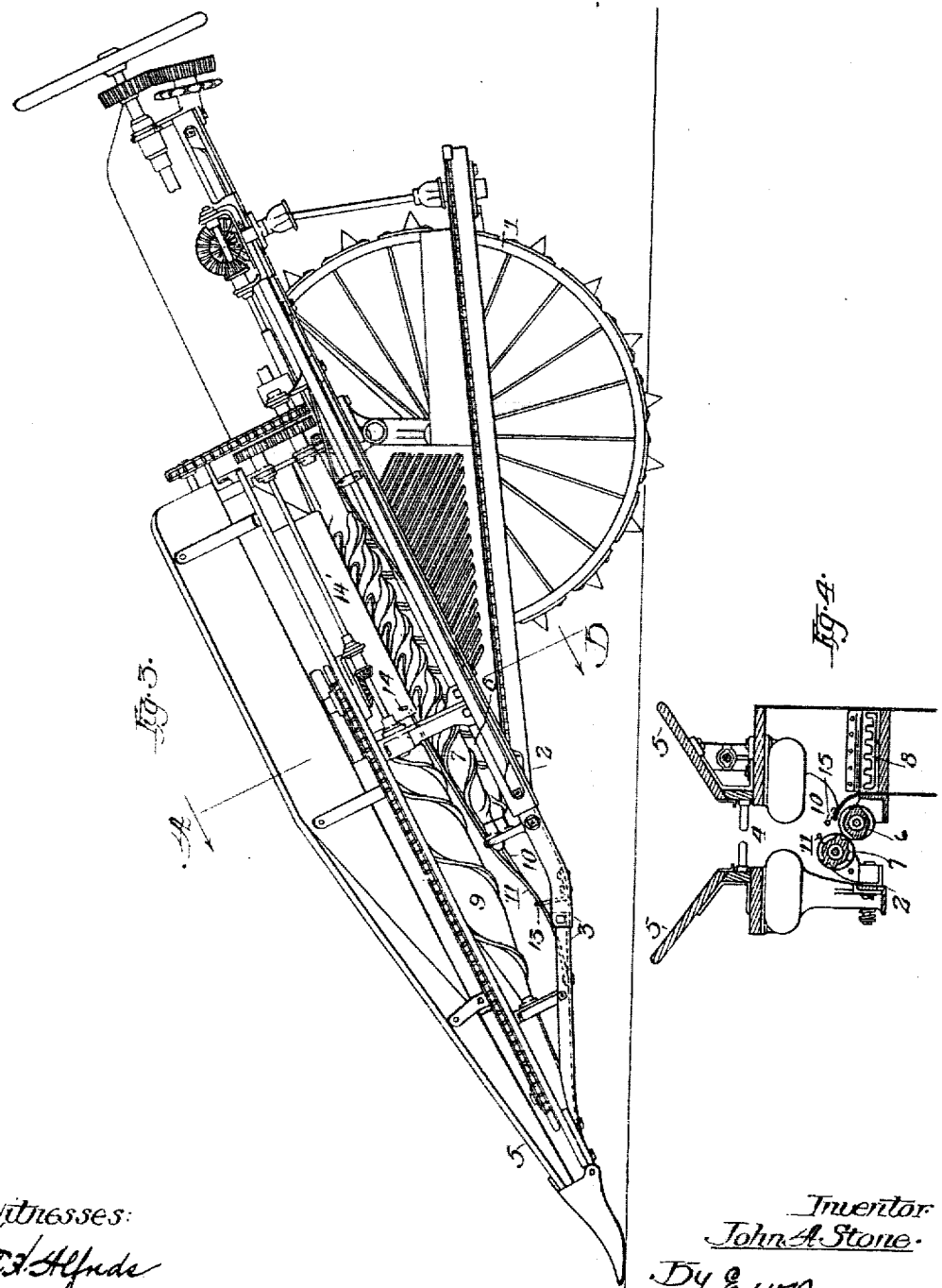

JOHN A. STONE, OF CHICAGO, ILLINOIS, ASSIGNOR TO INTERNATIONAL HARVESTER COMPANY, A CORPORATION OF NEW JERSEY.

CORN HARVESTER AND HUSKER.

No. 814,812.　　　Specification of Letters Patent.　　　Patented March 13, 1906.

Application filed October 14, 1905. Serial No. 282,741.

*To all whom it may concern:*

Be it known that I, JOHN A. STONE, a citizen of the United States, residing at Chicago, in the county of Cook and State of Illinois, have invented certain new and useful Improvements in Corn Harvesters and Huskers, of which the following is a specification, reference being had to the accompanying drawings, forming a part thereof.

My invention relates to corn harvesters and huskers, and particularly to that type of such machines having one or more pairs of feeding and snapping rollers upwardly and rearwardly inclined from the front of the machine and designed to receive a row of corn between them for the purpose of feeding the stalks rearward and downward and stripping the ears therefrom, the ears being conveyed to suitable husking devices forming a part of the complete machine.

The object of the invention is to provide a means for presenting the ears to the snapping-rollers in a manner to assist in a better and more certain separation of the ears from the stalks. I attain this object by the mechanism illustrated by the accompanying drawings, in which—

Figure 1 represents a side elevation, partly in section, of a part of a corn-harvester embodying my invention. Fig. 2 is a plan view of a part of Fig. 1, showing the forward portion of the snapping-rollers and the manner of attaching the fender-rods. Fig. 3 represents a side elevation, partly in section, of the machine as viewed from the opposite side of that illustrated by Fig. 1; and Fig. 4 represents a cross-section of Fig. 3 on line A B, the snapping-rollers being shown in section.

Referring to the drawings, like reference characters denote like parts throughout the several views.

1 represents the main drive-wheel, upon which is mounted a suitable wheel-frame 2, having forwardly-projecting members 3, designed to form a passage-way 4 for the incoming cornstalks.

5 represents a guiding-prong, one upon each side of the passage-way, mounted at their forward ends upon the members 3 and extending rearward and upward.

6 and 7 are the snapping-rollers, suitably mounted upon the main frame and extending rearward and upward substantially parallel with the guiding-prongs 5, and 8 is a conveyer designed to receive the ears of corn as they are separated from the stalks and convey them to the husking mechanism, (not shown,) the snapping-roller 6 adjacent the conveyer being located in a plane below that of the oppositely-disposed roller 7 for the purpose of insuring the proper presentation of the ears to the conveyer. Overlapping the forward ends of the snapping-rollers and in a plane above and substantially parallel therewith are feeding-rollers 9, one upon each side of the corn passage-way.

The machine as so far described is substantially like that shown in my United States Patent No. 786,239, issued March 28, 1905. It has been found in operating machines designed as illustrated therein that some of the ears of corn were not properly presented to the snapping-rollers, particularly the smaller ones and those having the husks closely adhering to the points of them, which are usually hanging downward from the stalks and would be presented to the snapping-rollers in that position, resulting in more or less shelling of the corn from the ears. To cure the above evil is the principal object of my invention, and as a means for attaining that result I have provided two oppositely-disposed fender-rods 10 and 11, one upon each side of the corn passage-way and having their forward ends secured to the frame-bars 3 and extending rearward, inward, and upward through supporting-brackets 12 and 13, having their rear ends arranged in substantially the same plane, parallel with each other and having a narrow passage-way between them for the reception of the incoming stalks, the rod 11 extending farther rearward and having a laterally-extending portion 14, projecting loosely through the side wall 14', secured to the fixed frame of the guiding-prong upon that side of the passage-way, the oppositely-disposed rod 10 having a hooked portion 15 extending laterally and forwardly of the body portion for the purpose of deflecting any separated ears that may slide downward along the rolls toward the ear-conveyer.

In operation the machine receives the row of corn between the guiding-prongs, and it enters between the forward ends of the feeding-rollers that assist in conducting the stalks rearward, where they are received between the snapping-rollers and the oppositely-disposed fender-rods. As the stalks are drawn downward by the action of the snapping-rollers they are closely pressed together by the yielding fender-rods and the ears are swung outward at their points by coming in contact with the rods and have their butt-ends presented to the snapping action of the rollers, effecting a more complete and satisfactory separation of the ears from the stalks.

What I claim as being my invention, and desire to secure by Letters Patent, is—

1. In a corn-harvester, the combination of a main drive-wheel, a wheel-frame having forwardly-projecting members forming a passage-way for the cornstalks, snapping-rollers suitably mounted upon opposite sides of said passage-way and inclined rearward and upward, an ear-conveyer arranged at one side of said passage-way, means for delivering the corn to said snapping-rollers comprising rearwardly, inwardly and upwardly inclined yielding fender-rods having their forward ends secured to said forwardly-projecting frame members and their rear ends extending substantially parallel with each other in a plane above and substantially parallel with said snapping-rollers, forming a narrow yielding passage-way for the incoming stalks and having the rear end of the fender-rod adjacent said ear-conveyer curved laterally downwardly and forwardly toward said ear-conveyer in a manner to deflect the ears thereto.

2. In a corn-harvester, the combination of a main drive-wheel, a wheel-frame having forwardly-projecting members forming a passage-way for the cornstalks, snapping-rollers suitably mounted upon opposite sides of said passage-way and inclined rearward and upward, an ear-conveyer arranged at one side of said passage-way, means for delivering the corn to said snapping-rollers comprising rearwardly, inwardly and upwardly inclined yielding fender-rods having their forward ends secured to said forwardly-projecting frame members and their rear ends extending substantially parallel with each other in a plane above and substantially parallel with said snapping-rollers, forming a narrow yielding passage-way for the incoming stalks and having the rear end of the fender-rod adjacent said ear-conveyer curved laterally downwardly and forwardly toward said ear-conveyer in a manner to deflect the ears thereto, and the oppositely-disposed fender-rod extended in rear of the end of the first-mentioned rod and loosely connected with a fixed part of the machine.

In witness whereof I hereto affix my signature in presence of two witnesses.

JOHN A. STONE.

Witnesses:
SIDNEY W. NICHOLLS,
O. A. ANDERSON.